UNITED STATES PATENT OFFICE.

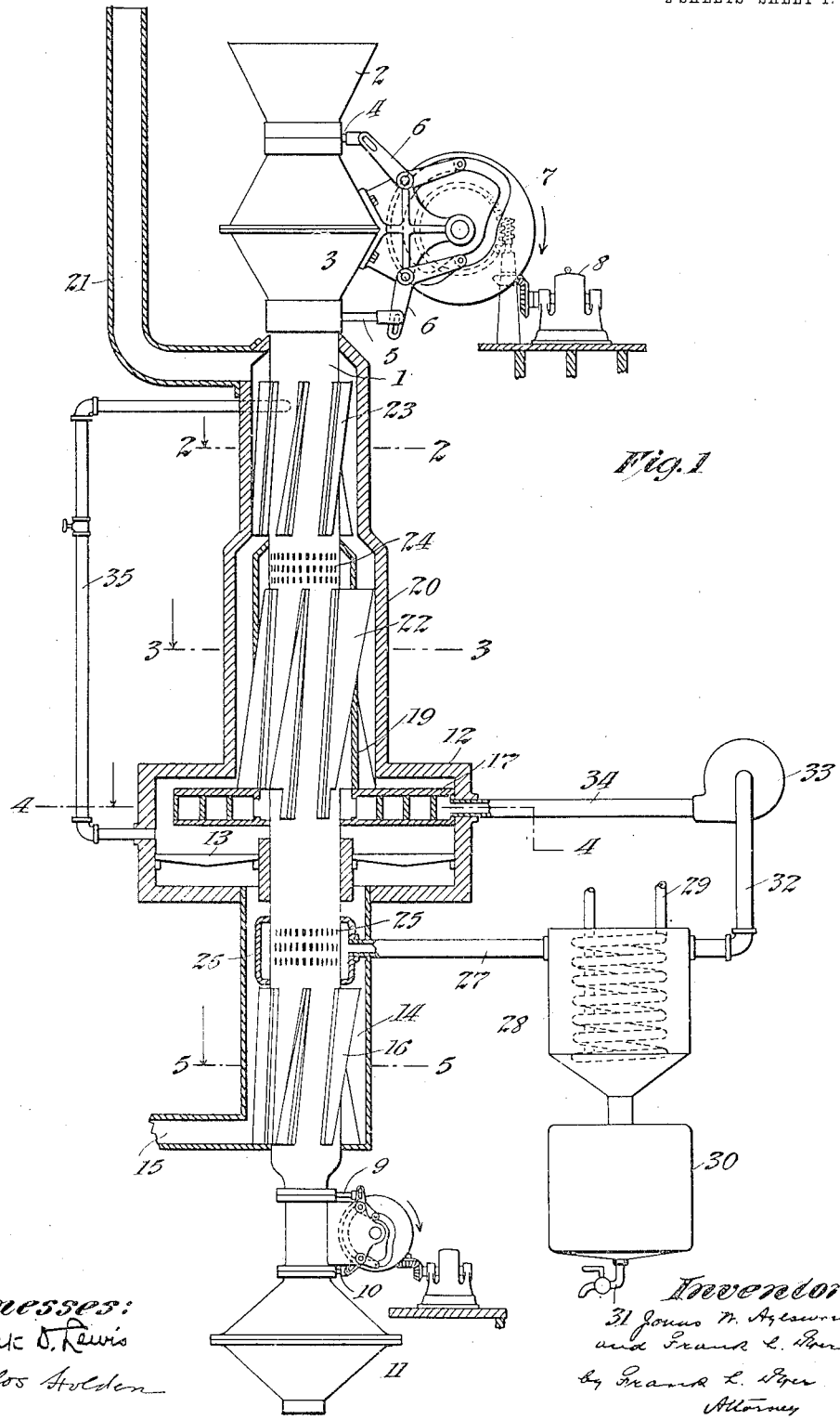

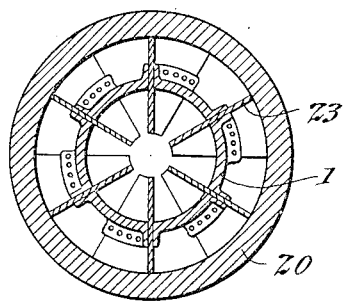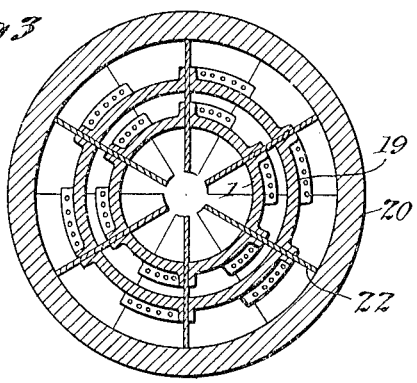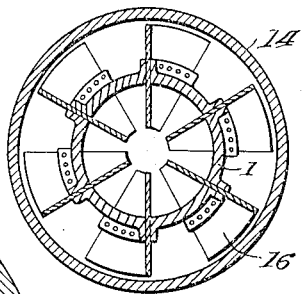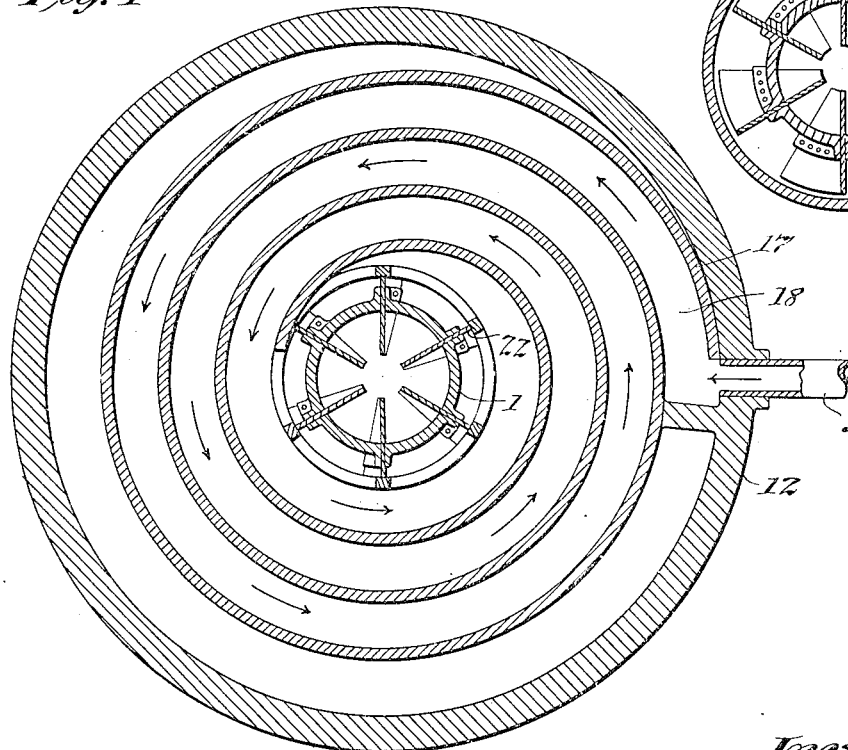

JONAS W. AYLSWORTH, OF EAST ORANGE, AND FRANK L. DYER, OF MONTCLAIR, NEW JERSEY.

APPARATUS FOR DISTILLING COAL.

No. 878,490.　　　Specification of Letters Patent.　　　Patented Feb. 11, 1908.

Application filed May 25, 1906. Serial No. 318,690.

To all whom it may concern:

Be it known that we, JONAS W. AYLSWORTH, a citizen of the United States, residing at 223 Midland avenue, East Orange, county of Essex, State of New Jersey, and FRANK L. DYER, a citizen of the United States, residing at Montclair, county of Essex, and State of New Jersey, have invented a certain new and useful Apparatus for Distilling Coal, of which the following is a description.

In our application Serial No. 318,691, filed May 25, 1906, we describe and claim a new smokeless coal, consisting of bituminous or soft coal, from which the smoke-producing elements have been eliminated, and we refer generally to the preferred apparatus for producing the same.

Our present invention contemplates an apparatus, which has been devised for the purpose of eliminating the smoke-producing elements from soft coals, although other materials may be successfully treated, since the process followed is a special distillation, which is applicable to the treatment of other distillable substances.

Our object generally is to provide a simple and efficient apparatus for the purpose.

In order that the invention may be better understood, attention is directed to the accompanying drawing, forming part of this specification, and in which—

Figure 1 is a vertical sectional view of the distilling apparatus embodying our present improvements, Fig. 2, a section on the line 2—2 of Fig. 1, Fig. 3, a section on the line 3—3 of Fig. 1, Fig. 4, a section on the line 4—4 of Fig. 1, Fig. 5, a section on the line 5—5 of Fig. 1.

In all of these views, corresponding parts are represented by the same numerals of reference.

In its essential features, the improved distilling apparatus is similar to the distilling apparatus which we have described in a concurrent application No. 318,692 filed May 25, 1906, and the method followed in carrying out the distilling operation is, in its general aspects, similar to that described and claimed in said application. In the concurrent application, we have broadly claimed the distilling apparatus, and we propose in the present case to describe and claim the specific apparatus especially adapted for use in the treatment of soft coals for the elimination of their smoke producing ingredients, but we will also describe herein the generic method followed in treating such materials.

The still 1 is a long vertical tube, preferably flaring from top to bottom, so as to facilitate the passage of material through the same. At the top is a hopper 2, beneath which is a buffer hopper 3, gate valves 4 and 5 at the bottom of the hopper 2 and at the bottom of the buffer hopper 3, respectively being alternately operated so as to permit successive charges of solid material to enter the still, without breaking the seal at the upper end. These gate valves are intermittently operated by any suitable mechanism, as for example, the levers 6—6, actuated by a cam 7, slowly driven by a motor 8, as shown. At its bottom, the still is provided with intermittently operated gate valves 9 and 10, actuated by similar mechanism, and opens into a receiving bin 11, in which the material may cool somewhat before being discharged into the atmosphere. Surrounding the still is a furnace 12, having grate bars 13 and supplied with air through a flue 14 which envelops the still, and having an inlet 15, leading to the atmosphere. A series of inclined wings 16 made preferably of copper extend through the walls of the still and project into the flue 14 and within the still (see Fig. 5) whereby the material passing through the still will be checked in its descent, and pressure on the still walls, due to the height of the column of material, will be relieved and the material will be more or less agitated. The principal function, however, of these inclined wings, is to act as heat conductors for carrying off the heat from the material into the flue 14, so as to heat the air passing up through the flue to the furnace. This acts as a regenerative device, heat being abstracted from the treated coal, or other material, and being imparted to the incoming combustion air. The inclined wings are, therefore, made preferably of copper or aluminium, so as to readily conduct heat. Mounted in the furnace 12, is a drum 17 (see Fig. 4), having a spiral flue 18, which opens into a space between the still and a jacket 19. Outside of the jacket 19 is a second jacket 20, acting as a stack for carrying off the products of combustion from the furnace 12 and connecting at its upper end with a stack flue 21. Inclined wings 22, similar to the wings 16 extend into the still and pass through the wall 19, so that heat from the products of combustion passing through the stack, will be conducted and imparted to the material undergoing distillation. The inclined wings 22, also serve to check the passage of the material through the still, to partially support the same, and to keep the material in movement, so as to permit the more ready passage of the distillation gases through the material, as will be explained. At the upper end of the still (Fig. 2) a third series of inclined copper plates 23 are arranged within the still and extend into the stack 20, so as to convey heat from the products of combustion to the material within the still. The distillation zone of the still is formed between perforations 24 and 25, the former being located within the upper end of the chamber, formed by the partition 19. Surrounding the perforations 25 is a jacket 26, from which a pipe 27 leads to a condenser 28 of any suitable type, that shown being provided with a coil 29, through which cooling water circulates. The distillate separated by the condenser falls into a tank 30, from which it may be drawn off by a pipe 31. Leading from the condenser 28 is a pipe 32, connected with an inlet to a pump, blower or compressor 33, the discharge from which connects by a pipe 34, with an inlet to the flue 18 of the drum 17.

With the apparatus shown, provision is made for carrying on the distilling process at atmospheric pressure, and to this end a pipe 35 leads from the upper part of the still to the furnace 12, so as to carry off any excess gases accumulating in the still. In our application filed on even date herewith, we describe means by which, with a still of this type, the operations may be carried on below or above atmospheric pressure, and such means can obviously be employed with the improved apparatus.

In carrying the process into effect, and assuming the apparatus to be used for the treatment of soft coal, so as to eliminate the smoke-producing ingredients therefrom, we charge the still with the material through the gate valves 4 and 5, whereby the material will slowly progress through the still, being withdrawn at the lower end through the gate valves 9 and 10. As the material passes over the inclined wings 23, heat will be imparted to the same, since these wings will be kept hot by the products of combustion from the furnace 12, and, of course, the material will also be heated through the walls of the still. As the material reaches the distilling zone between the perforations 24 and 25, it will encounter a flow of non-oxidizing heated gases circulated by the pump or compressor 33 through the flue 18, Fig. 4 thence between the still and jacket 19, into the perforations 24, the gases leaving the still through the perforations 25, and passing through the condenser 28, by which the condensable ingredients will be removed, thence again to the compressor. These gases will be heated in their passage through the drum 17, as well as in their passage in contact with the wings 22, which wings will be heated by the escaping products of combustion from the furnace. Care should be taken so as to maintain the temperature of the circulating gases between 550° and 800° F., so as to eliminate the desired smoke-producing ingredients, but of course, the amount of fuel used and the temperature will be regulated according to the material to be treated. As the gases accumulate in the still in excess of those required in the circulating system, they will escape through the pipe 35, and be consumed in the furnace or they may be used industrially in any other desired way. The treated material leaving the still passes over the inclined wings 16 and imparts heat to the same so as to heat the incoming air to the furnace, as explained.

Having now described our invention, what we claim as new and desire to secure by Letters Patent is as follows:—

1. An improved distilling apparatus comprising an elongated still, a furnace surrounding said still, a stack therefor inclosing the still, a heating coil in the furnace, a closed circulating system including said heating coil and a distilling zone maintained within the still, substantially as set forth.

2. A distilling apparatus comprising an elongated still having means between its ends for admitting heated gases thereinto and means at another point between its ends for discharging the heated gases carrying the vaporized distillate therefrom, and a furnace surrounding the still for heating the still and for heating the gases before their admission into the still, substantially as set forth.

3. An improved distilling apparatus, comprising a vertical still, means for introducing material at the upper end and means for removing material from the lower end of the still, a furnace surrounding the still, a stack therefrom inclosing the still, a heating coil in the furnace and a closed circulating system, including said heating coil, and a distilling zone maintained within the still, substantially as set forth.

4. In distilling apparatus, the combination with a still, of a series of inclined wings extending through the walls thereof and opening into a flue surrounding the still, substantially as set forth.

5. In a distilling apparatus, the combination with a still, of a reheater adjacent to the same, a jacket surrounding the still and forming a flue leading to said heater, and a series of wings extending from within the still through its walls into said flue, substantially as set forth.

6. In a distilling apparatus, the combination with a still, of a reheater adjacent to the same, a jacket surrounding the still and forming a flue for carrying off the products of combustion from said reheater, and a series of inclined wings extending from within the still through its walls and into said flue, substantially as set forth.

7. In a distilling apparatus, the combination with a vertical still, of a spiral reheating coil surrounding the same, connected at its ends with a distilling zone maintained within the still, a jacket surrounding the still and connected with the discharge from the reheating coil, a second jacket exterior of the same, and a series of inclined wings extending from within the still through its walls and through the first mentioned jacket, substantially as set forth.

This specification signed and witnessed this 24th day of May, 1906.

JONAS W. AYLSWORTH.
FRANK L. DYER.

Witnesses:
ANNA R. KLEHM,
JOHN A. BOEHME.